US011621611B2

(12) United States Patent
Walton (10) Patent No.: US 11,621,611 B2
(45) Date of Patent: Apr. 4, 2023

(54) ELECTRIC MACHINE WITH BAFFLE MEMBER FOR FILTERING AIR FLOW

(71) Applicant: BorgWarner Inc., Auburn Hills, MI (US)

(72) Inventor: John Walton, McCordsville, IN (US)

(73) Assignee: BorgWarner Inc., Auburn Hills, MI (US)

( * ) Notice: Subject to any disclaimer, the term of this patent is extended or adjusted under 35 U.S.C. 154(b) by 316 days.

(21) Appl. No.: 17/117,838

(22) Filed: Dec. 10, 2020

(65) Prior Publication Data
US 2021/0194329 A1    Jun. 24, 2021

Related U.S. Application Data

(60) Provisional application No. 62/951,347, filed on Dec. 20, 2019.

(51) Int. Cl.
| | |
|---|---|
| *H02K 9/26* | (2006.01) |
| *H02K 5/20* | (2006.01) |
| *H02K 9/06* | (2006.01) |
| *B01D 45/08* | (2006.01) |
| *H02K 7/18* | (2006.01) |
| *F02B 63/04* | (2006.01) |

(52) U.S. Cl.
CPC .............. *H02K 9/26* (2013.01); *B01D 45/08* (2013.01); *H02K 5/207* (2021.01); *H02K 7/1815* (2013.01); *H02K 9/06* (2013.01); *F02B 63/042* (2013.01)

(58) Field of Classification Search
CPC ........ B01D 45/08; H02K 7/1815; H02K 9/06; H02K 5/207; H02K 9/26; H02K 11/33; H02K 21/22; H02K 11/0094
See application file for complete search history.

(56) References Cited

U.S. PATENT DOCUMENTS

| | | | |
|---|---|---|---|
| 5,214,324 A | | 5/1993 | Holmes |
| 5,814,908 A | * | 9/1998 | Muszynski ......... F04D 29/5806 |
| | | | 310/58 |

(Continued)

FOREIGN PATENT DOCUMENTS

| | | |
|---|---|---|
| EP | 1 515 416 A1 | 3/2005 |
| EP | 2 860 853 A1 | 4/2015 |

(Continued)

*Primary Examiner* — Ahmed Elnakib
*Assistant Examiner* — Leda T Pham
(74) *Attorney, Agent, or Firm* — Bose McKinney & Evans LLP (57) ABSTRACT

An electric machine having a housing with the rotor and stator disposed within the housing. The housing defines at least one housing opening allowing the inflow of air into the housing. A baffle is mounted on the housing and controls the inflow of air into the housing opening. The baffle member defines an inlet in communication with the ambient air, an outlet in communication with the housing opening, and a passageway extending from the inlet to the outlet. The baffle defines at least one impact surface within the passageway for changing the direction of air flow between the inlet and the outlet and the baffle further defines a drain port wherein the passageway directs moisture collecting on the impact surface to the drain port where it is discharged from the baffle. The electric motor may be an axial flow air-cooled alternator having a fan for generating the air flow.

20 Claims, 10 Drawing Sheets

(56) References Cited

U.S. PATENT DOCUMENTS

| | | | |
|---|---|---|---|
| 8,251,676 B2 | 8/2012 | Fleischmann et al. | |
| 8,311,708 B2 | 11/2012 | Kerns | |
| 2010/0141063 A1* | 6/2010 | Oh ........................ | H02K 5/207 |
| | | | 310/62 |

FOREIGN PATENT DOCUMENTS

| | | |
|---|---|---|
| GB | 2546735 A | 8/2017 |
| WO | WO 93/13584 | 7/1993 |
| WO | WO 2010/037248 A1 | 4/2010 |
| WO | WO 2020/157464 A1 | 8/2020 |

* cited by examiner

ELECTRIC MACHINE WITH BAFFLE MEMBER FOR FILTERING AIR FLOW

CROSS REFERENCE TO RELATED APPLICATIONS

This application claims priority under 35 U.S.C. 119(e) of U.S. provisional patent application Ser. No. 62/951,347 filed on Dec. 20, 2019 entitled ELECTRIC MACHINE WITH BAFFLE MEMBER FOR FILTERING AIR FLOW the disclosure of which is hereby incorporated herein by reference.

BACKGROUND

1. Technical Field

The present invention relates to electric machines such as vehicle alternators.

2. Description of the Related Art

Many electric machines utilize air flow through or over some portion of the electric machine or housing to cool the electric machine during operation. Oftentimes, a fan blade assembly is attached to the rotor shaft of the electric machine to create an axial air flow through the electric machine to provide a cooling air flow. Such electric machines can be found in vehicles. For example, vehicle alternators often use such axially directed air flow for cooling purposes.

In some vehicles and applications this axially directed air flow through the electric machine can cause problems. For example, city buses often have an internal combustion engine located near the bottom rear of the bus. The alternators of such buses are often subjected to substantial exposure to salt containing moisture during the winter due to salting of the streets. Such salt containing moisture is highly corrosive and when such salt containing moisture is in the air flow through an alternator it can generate damaging corrosion within the alternator leading to its premature failure.

SUMMARY

The present invention provides an electric machine with a baffle member that removes moisture from the air before it is introduced into the electric machine to thereby limit the damage when the electric machine is used in an environment with salt containing moisture.

The invention comprises, in one form thereof, an electric machine that includes a rotor operably coupled with a stator, the rotor being rotatable about an axis; a housing wherein the rotor and stator are disposed within the housing and the housing defines at least one housing opening allowing air to flow through the housing; a baffle mounted on the housing and controlling an inflow of air into the at least one housing opening, the baffle defining an inlet in communication with the ambient air, an outlet in communication with the at least one housing opening, and a passageway extending from the inlet to the outlet, wherein the inflow of air defines an airflow path that sequentially enters the baffle through the inlet, flows through the passageway, exits the baffle through the outlet and enters the at least one housing opening and wherein the baffle defines at least one impact surface within the passageway for changing a direction of the airflow path between the inlet and the outlet and the baffle further defines a drain port wherein the baffle is configured to direct moisture collecting on the impact surface to the drain port where the moisture is discharged from the baffle to the ambient air.

In some embodiments, the moisture is directed to the drain port and discharged from the baffle by gravity.

In some embodiments, the electric machine includes a rotor shaft which rotates with the rotor during operation of the electric machine and a fan blade assembly coupled to the rotor shaft whereby rotation of the rotor shaft rotates the fan blade assembly, the fan blade assembly being disposed on a first axial end of the electrical machine and the baffle being mounted to a second axial end of the electric machine opposite the fan blade assembly wherein rotation of fan blade assembly generates the inflow of air flow entering the at least one housing opening from the outlet of the baffle and wherein the inflow of air flows through the housing in an axial direction.

In some embodiments, the inlet is disposed radially outwardly of the outlet relative to the axis. In such embodiments, the impact surface may direct the airflow path radially inwardly between the inlet and the outlet. The impact surface may be formed by first and second oppositely facing, axially spaced apart impact surfaces wherein the airflow path is axially redirected the first impact surface and then axially redirected by the second impact surface between the inlet and the outlet. Each of the first and second impact surfaces may also direct the airflow path radially inwardly to thereby define an S-shaped airflow path between the inlet and the outlet. Such embodiments may also include an outlet that defines a central opening wherein the inlet is formed by one or more elongate, arcuate openings disposed radially outwardly of the outlet relative to the axis. The baffle may also include a central cover member disposed axially outwardly of the outlet and having an exterior surface area which, in a plane perpendicular to the axis, is at least co-extensive with the central opening defined by the outlet. The baffle may be formed by at least two separate baffle members mechanically secured together with a first baffle member defining the outlet and a second baffle member defining the inlet. The electric machine may also include a rotor shaft which rotates with the rotor during operation of the electric machine and a fan blade assembly coupled to the rotor shaft whereby rotation of the rotor shaft rotates the fan blade assembly, the fan blade assembly being disposed on a first axial end of the electrical machine and the baffle being mounted to a second axial end of the electric machine opposite the fan blade assembly wherein rotation of fan blade assembly generates the inflow of air flow entering the at least one housing opening from the outlet of the baffle and wherein the inflow of air flows through the housing in an axial direction. The drain port may take the form of at least three drain ports formed by openings in the passageway, the at least three drain ports being circumferentially distributed about an arc of at least 180 degrees relative to the axis whereby the moisture is directed to one of the drain ports and discharged from the baffle by gravity in a plurality of different rotational orientations when the axis is positioned horizontally. The baffle may also include a mounting flange extending from the second baffle member, the mounting flange being secured to the housing. Such a mounting flange may include at least one flange opening wherein an electrical terminal extending from the housing which is adapted to operably couple the electric machine to an external electrical circuit extends through the at least one flange opening. Such an electrical machine may be adapted to function as a vehicle alternator.

In other embodiments, the impact surface radially and axially redirects the airflow path between the inlet and the outlet.

In other embodiments, the drain port comprises at least three drain ports formed by openings in the passageway, the at least three drain ports being circumferentially distributed about an arc of at least 180 degrees relative to the axis whereby the moisture is directed to one of the drain ports and discharged from the baffle by gravity in a plurality of different rotational orientations when the axis is positioned horizontally. In such an embodiment, the outlet may define a central opening with the inlet being formed by one or more elongate, arcuate openings disposed radially outwardly of the outlet relative to the axis; and the impact surface may take the form of first and second oppositely facing, axially spaced apart impact surfaces wherein the airflow path is axially redirected the first impact surface and then axially redirected by the second impact surface and wherein each of the first and second impact surfaces direct the airflow path radially inwardly to thereby define an S-shaped airflow path between the inlet and the outlet. The electric machine may also include a rotor shaft which rotates with the rotor during operation of the electric machine and a fan blade assembly coupled to the rotor shaft whereby rotation of the rotor shaft rotates the fan blade assembly, the fan blade assembly being disposed on a first axial end of the electrical machine and the baffle being mounted to a second axial end of the electric machine opposite the fan blade assembly wherein rotation of fan blade assembly generates the inflow of air flow entering the at least one housing opening from the outlet of the baffle and wherein the inflow of air flows through the housing in an axial direction. The baffle may also be formed by at least two separate baffle members mechanically secured together, a first baffle member defining the outlet and a second baffle member defining the inlet, the drain ports being formed by openings in the second baffle member.

In any of the various embodiments described herein, the electrical machine may be adapted to function as a vehicle alternator.

Moreover, while the specific features of the embodiments disclosed herein are described in numerous combinations, they may also be incorporated into alternative combinations not specifically described herein.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

Figure 1:
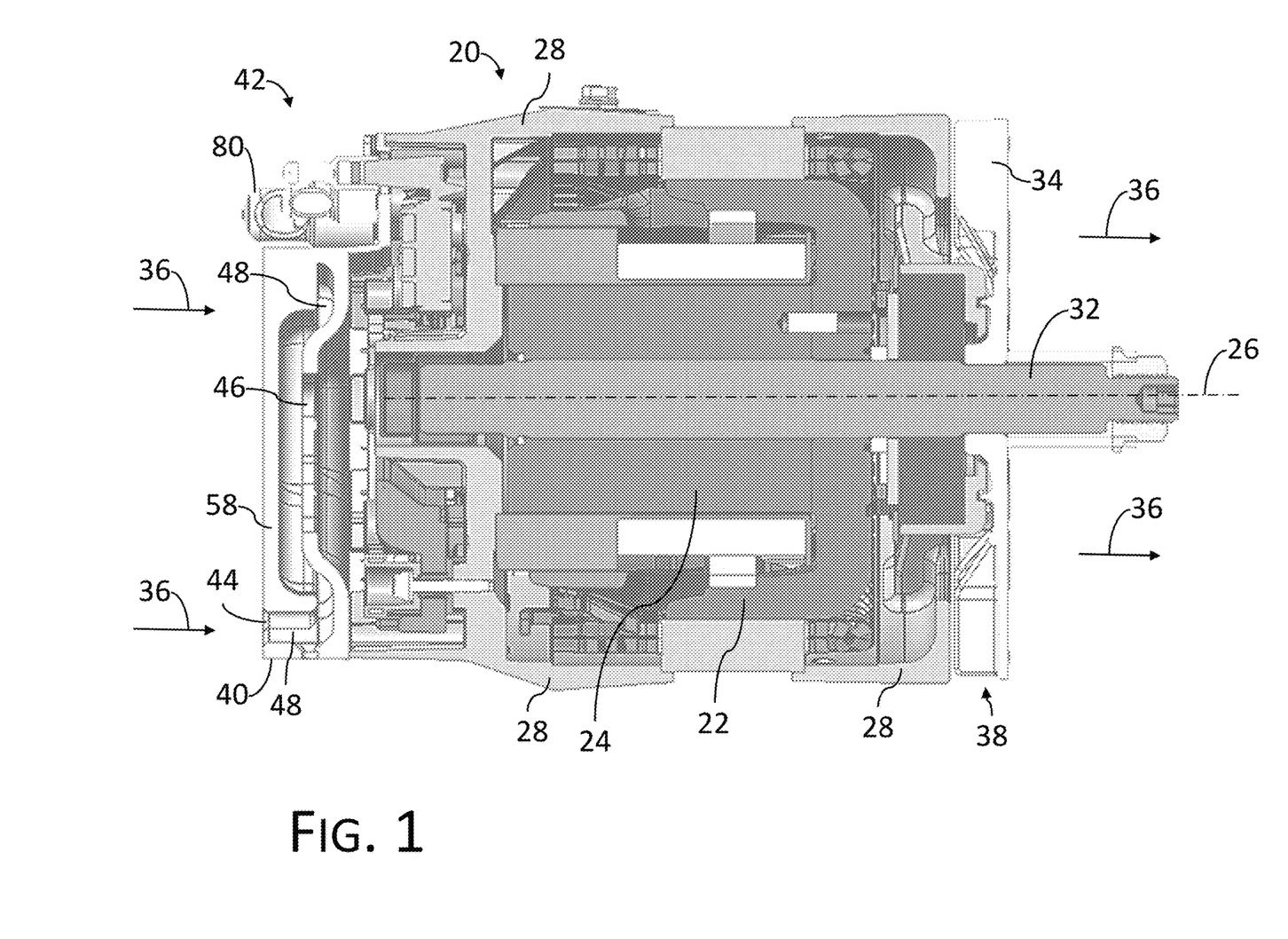
FIG. 1 is a cross-sectional view of an electric machine with a baffle member.

An electric machine 20 is shown in FIG. 1 and includes a stator 22 operably coupled with a rotor 24. Rotor 24 rotates about axis 26 during operation of electric machine 20. Stator 22 and rotor 24 are disposed within a housing 28 which has at least one housing opening 30 which allows for the inflow of air into housing 28. Rotor 24 is rotationally fixed on rotor shaft 32 whereby rotor 24 and rotor shaft 32 rotate together during operation of electric machine 20. A fan blade assembly 34 is also rotationally fixed to shaft 32.

In the illustrated embodiment, electric machine 20 is an axial air-flow cooled alternator and fan blade assembly 24 pulls air in an axial direction through housing 28 in the direction indicated by arrows 36. Fan blade assembly 24 is located axial end 38 of electric motor and a baffle 40 is located on the opposite axial end 42. Baffle 40 is positioned such that the inflow of air into housing 28 first passes through baffle 40 before entering housing 28 travelling the axial length of housing 28 and then exiting at axial end 38. Housing 28 includes openings at both axial ends 38, 42 whereby the air travels the full axial length of housing 28 to provide a cooling effect to the electric machine and associated circuitry. As discussed below, baffle 40 removes moisture and solid matter from the air flow entering the housing to thereby help protect electric machine 20 from the damaging effects of such moisture and solid matter.

While electric machine 20 is a vehicle alternator in the illustrated embodiment, alternative embodiments may have a different design and be used for other application in alternative embodiments. It is noted, however, that baffle 40 will be particularly useful for electric machines which are air-cooled and are used in environments wherein the ambient air includes moisture or solid matter which might foul or degrade the operation of the electric machine. Baffle 40 is also particularly advantageous when used with axial flow air-cooled electric machines having a fan mounted on the rotor shaft for generating the air flow as exemplified by electric machine 20.

Baffle 40 is shown in greater detail in FIGS. 2-6. Baffle 40 is mounted on housing 28 and controls the air flow into housing opening 30 at axial end 42 of electric motor 20. Baffle 40 defines an inlet 44 in communication with the ambient air and an outlet 46 which is in communication with housing opening 30. Passageway 48 extends between inlet 44 and outlet 46 and communicates air that enters through inlet 44 to outlet 46 where it proceeds into housing 28 through housing opening 30. Portions of the interior surface of passageway 48 define impact surfaces 50A, 50B which change the direction of air flow within passageway 48 between inlet 44 and outlet 46. In the illustrated embodiment, passageway 48 defines an S-shaped flow pattern for the inflow of air between inlet 44 and outlet 46 as indicated by arrows 54 in FIG. 2 which is a cross-sectional view taken through and parallel with axis 26.

Figure 2:
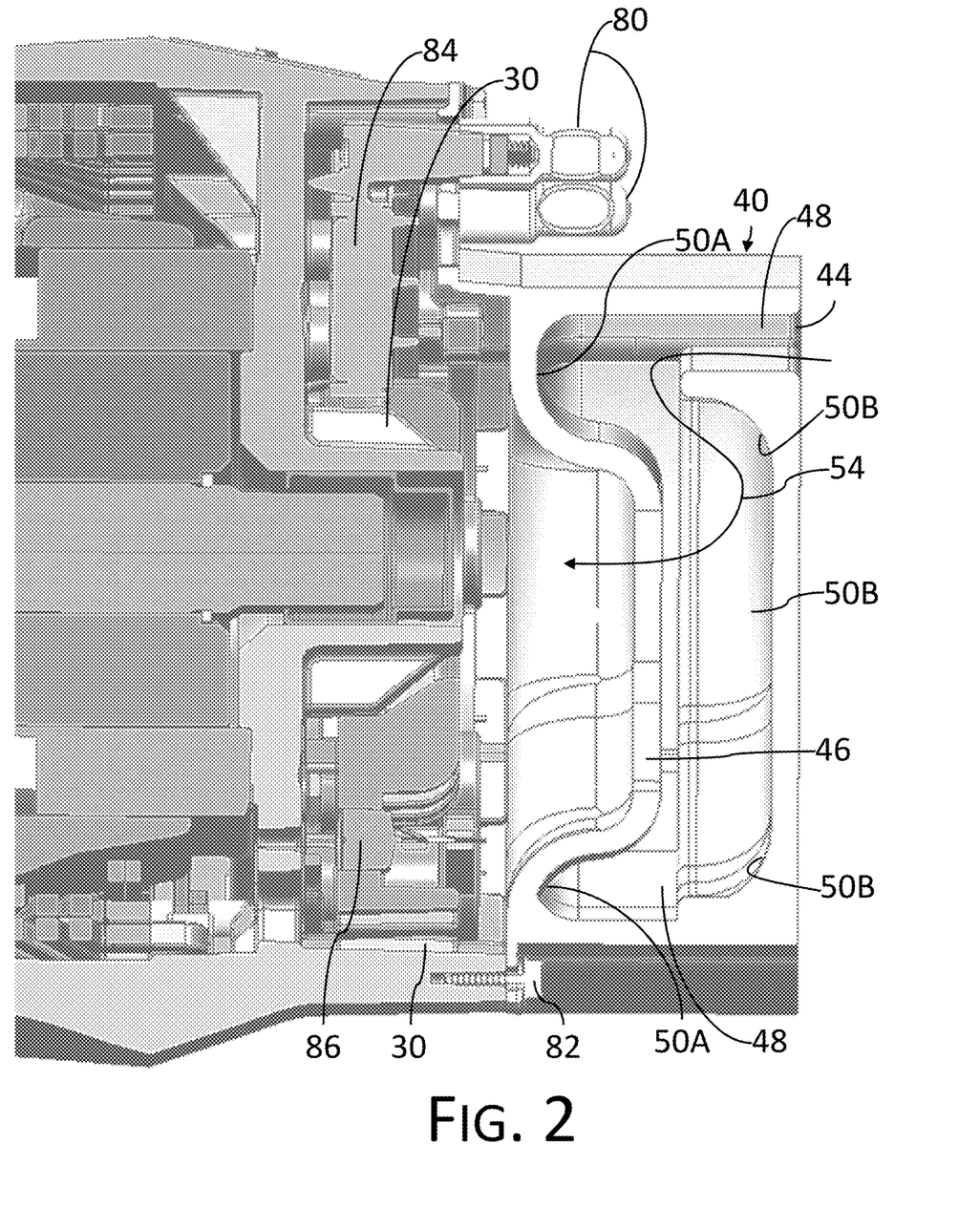
FIG. 2 is a detail view of FIG. 1 showing the baffle.
Figure 3:
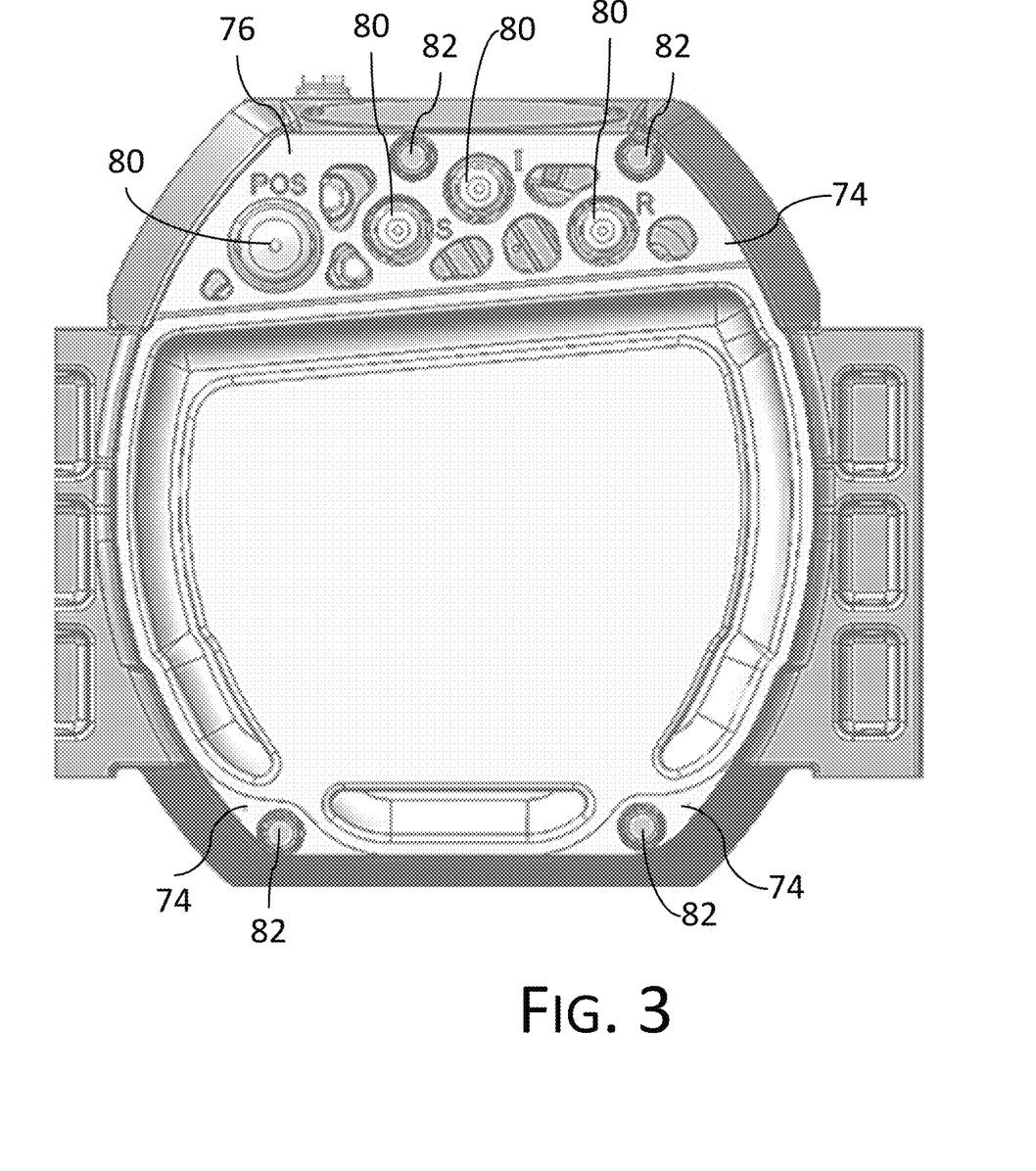
FIG. 3 is an end view of the baffle attached to the electric machine.

As can be seen FIG. 2, passageway 48 reverses the direction of the air flow twice by 180 degrees by means of the two oppositely facing, axially spaced, impact surfaces 50A, 50B which encircle the central opening defined by outlet 46.

As best understood with reference to FIG. 2, baffle 40 controls the inflow of air and defines a passageway extending from the inlet to the outlet, wherein the inflow of air defines an airflow path 54 that sequentially enters the baffle through the inlet 44, flows through the passageway 48, exits the baffle through the outlet 46 and enters the at least one housing opening 30 and wherein the baffle defines impact surfaces 50A, 50B within the passageway 48 for changing a direction of the airflow path 54. In the embodiment depicted in FIG. 2, there are two impact surfaces 50A, 50B which are oppositely facing, axially spaced apart impact surfaces wherein the airflow path is axially redirected by the first impact surface 50A and then axially redirected by the second impact surface 50B and wherein each of the first and second impact surfaces 50A, 50B direct the airflow path radially inwardly to thereby define an S-shaped airflow path 54 between the inlet 44 and the outlet 46.

Inlet 44 is formed by one or more elongate, arcuate openings 56 which are disposed radially outwardly of outlet 46 relative to axis 26. In other words, the radial distance to inlet openings 56 from axis 26 is greater than the radial distance from axis 26 to the outer boundary of outlet 46. As can also be seen in the figures, in the illustrated example, baffle 40 includes a central cover member 58 disposed axially outwardly of outlet 46 and has a surface area that is co-extensive or slightly larger than the central opening formed by outlet 46 when such surface areas are measured in a plane perpendicular to axis 26.

Central cover member 58 is supported by support members 60 which extend across inlet 44 from the outer shell portion 62 of baffle 40 to the central cover member 58. In the embodiments of FIGS. 1-6, the baffle includes two such support members 60 while the embodiment depicted in FIGS. 9-11 includes three support members 60. Alternative embodiments might use a screen that extends across inlet 44 to both support cover member 58 and prevent larger debris from entering inlet 44 and not include any support members 60. Still other configurations could alternatively be used to provide structural support for a central cover member 58.

Baffle 40 includes a drain port 52 which, in the illustrated embodiments is formed by an opening in the external sidewall of passageway 48. When air containing moisture and/or solid matter comes into contact with impact surfaces 50, the air flow changes direction and the moisture and solid particles impact upon impact surfaces 50. Much of the moisture and solid particles carried with the inflowing air will not reverse direction with the air flow and will instead be directed downward within the passageway under the influence of gravity. Drain port 52 is positioned at the low point of passageway 48 and allows the moisture and solid matter collected within passageway to be discharged from baffle 40 into the ambient air under the influence of gravity.

While the exemplary drain port 52 is a simple opening in the exterior sidewall of passageway 48, the drain port 52 could be formed by inlet 44 or a portion thereof. Alternatively, a more elongate channel leading from passageway 48 to the ambient surroundings could be used.

Figure 4:
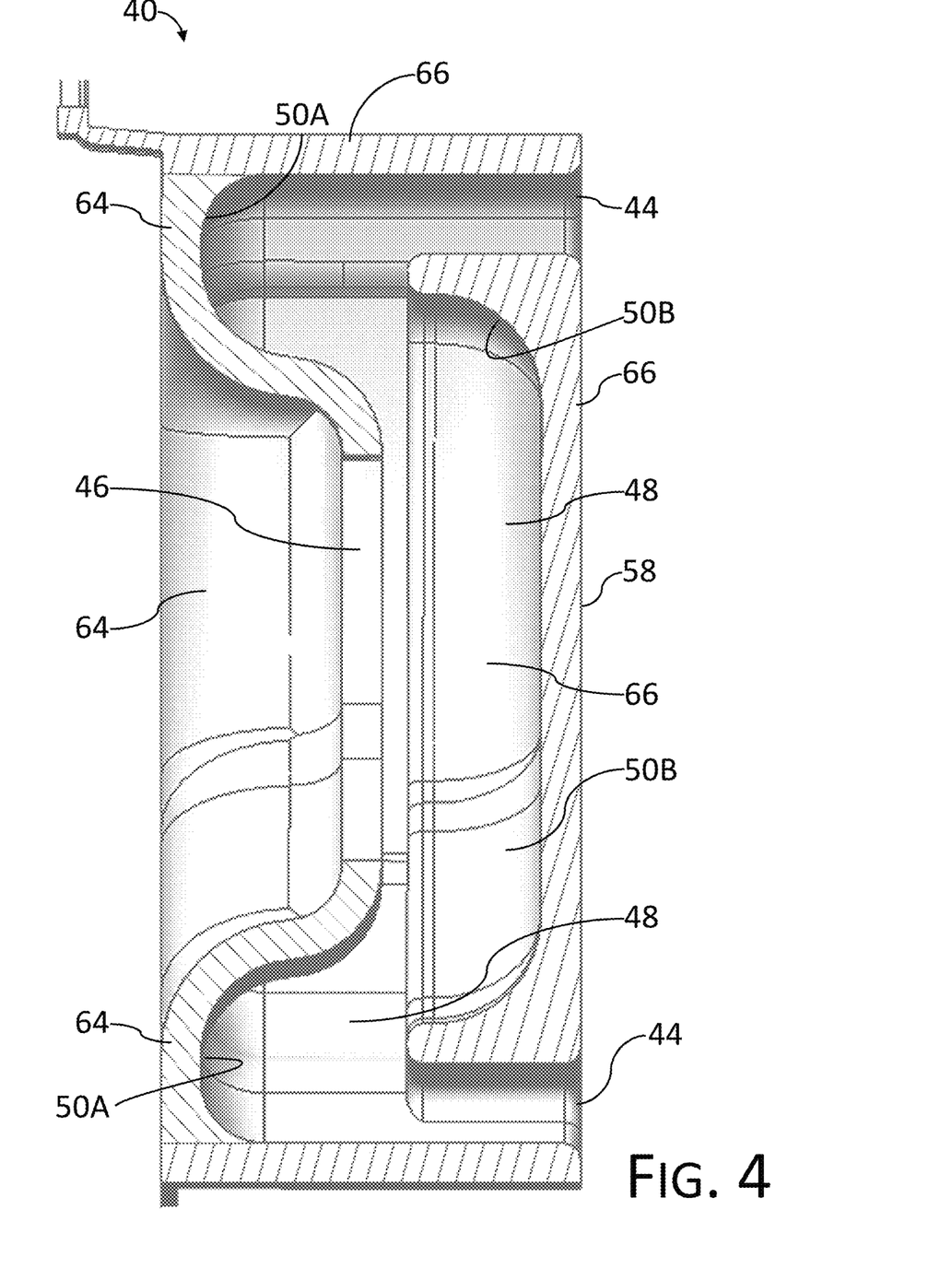
FIG. 4 is a cross-sectional view of the baffle.
Figure 5:
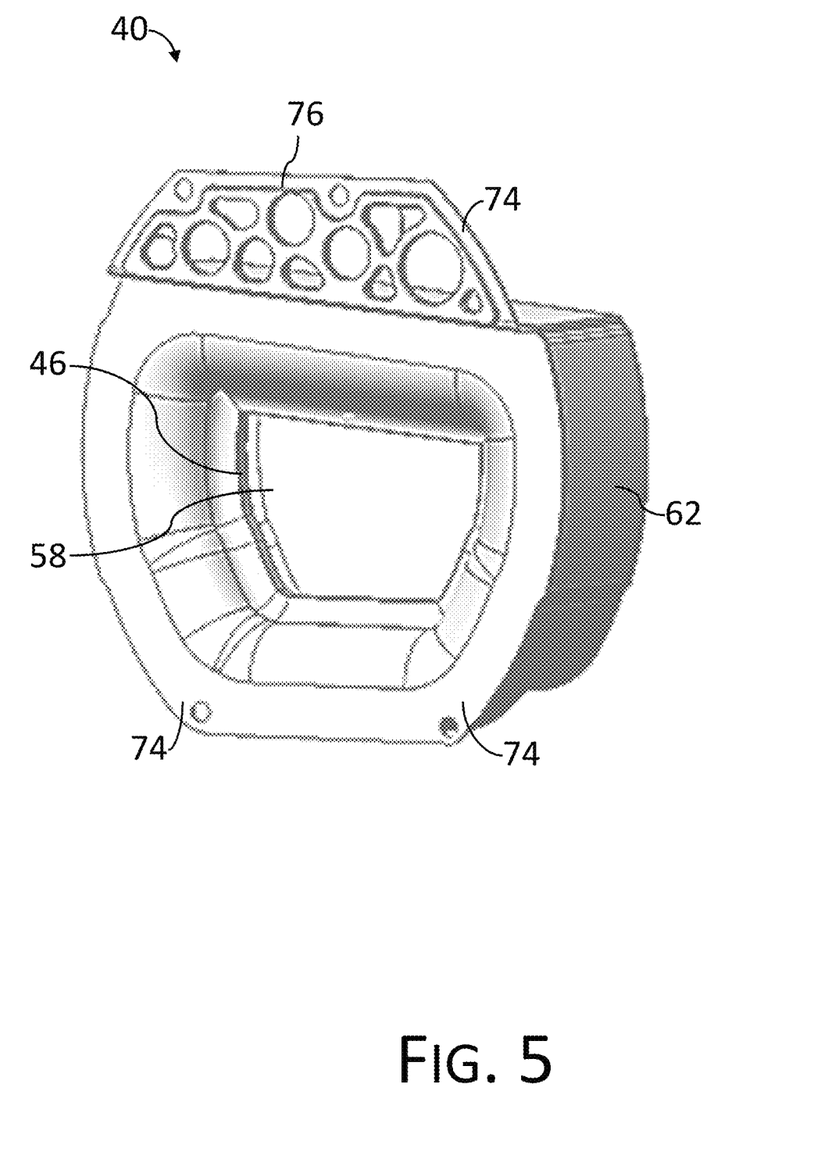
FIG. 5 is a perspective view of the baffle.
Figure 6:
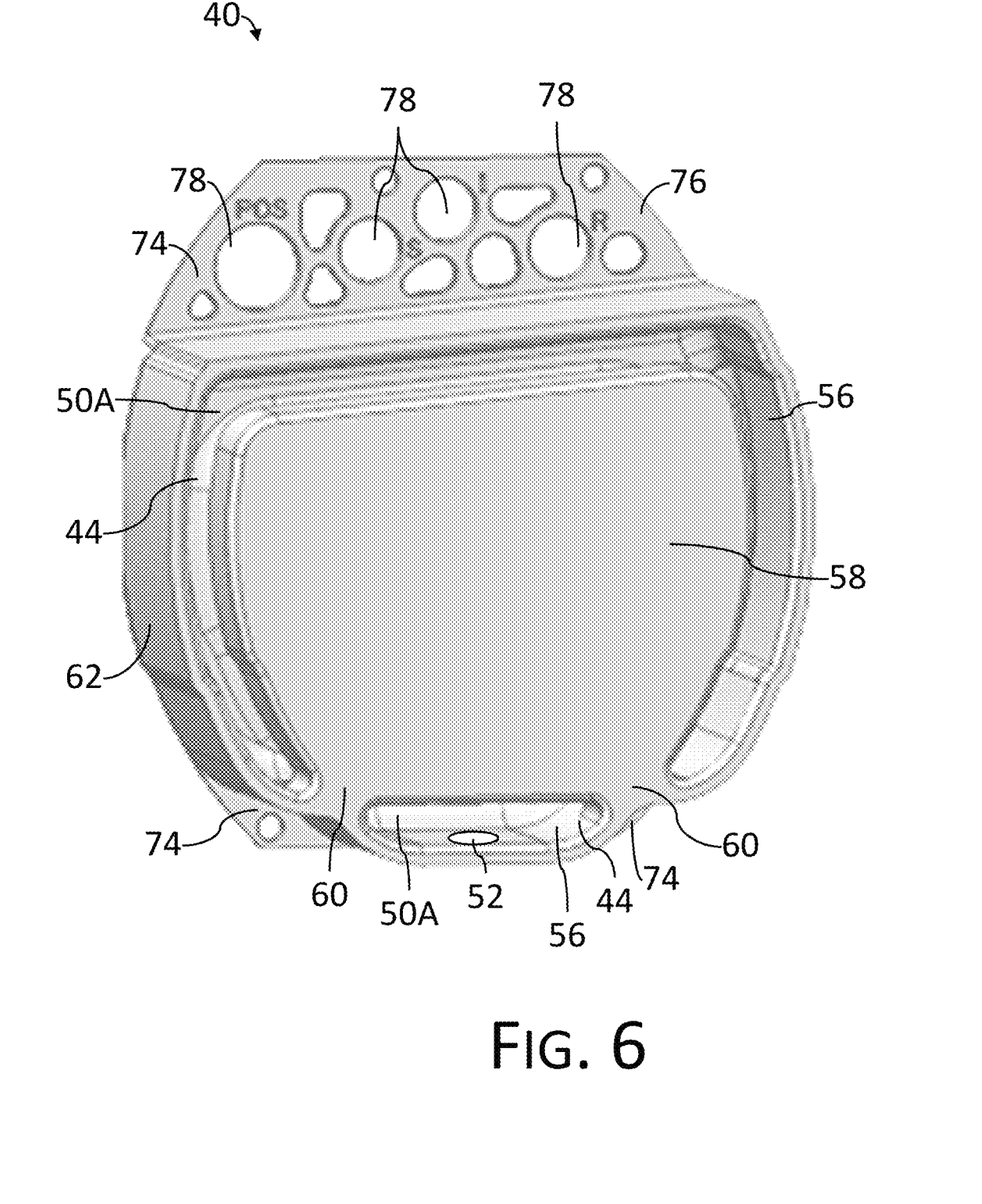
FIG. 6 is another perspective view of the baffle.
Figure 7:
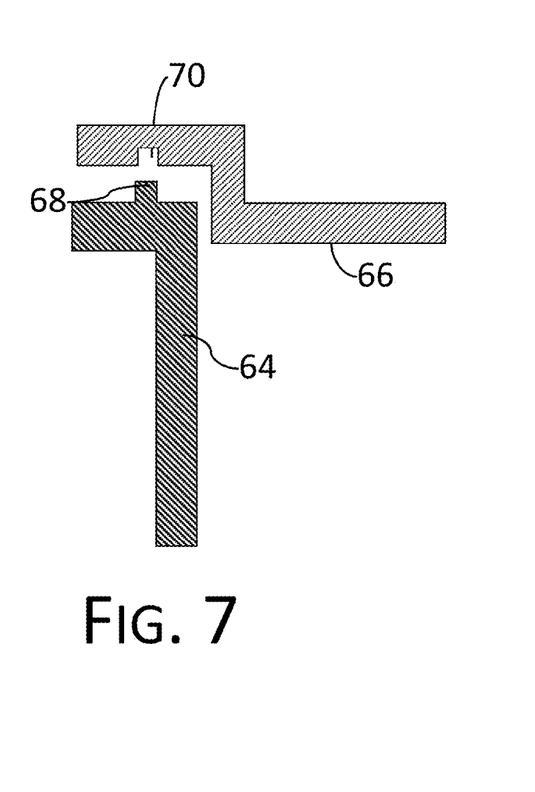
FIG. 7 is a schematic view showing a connection for a two-piece baffle assembly.
Figure 8:
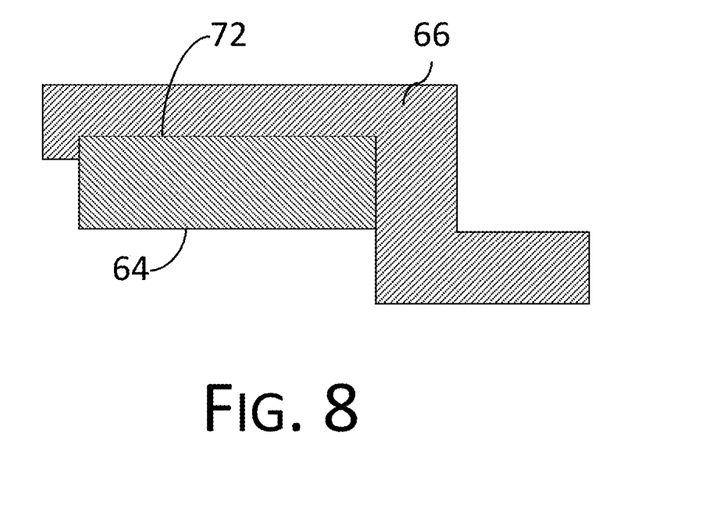
FIG. 8 is a schematic view showing another connection for a two-piece baffle assembly.

Baffle 40 depicted in FIGS. 1 and 2 is a one-piece baffle formed out of a single unitary piece of material. Baffle 40 can, however, also be formed out of multiple parts and baffle 40 depicted in FIG. 4 is formed out of two separate parts. In the embodiment of FIG. 4, first baffle member 64 defines outlet 46 and second baffle member 66 defines inlet 44 and drain ports 52. FIGS. 7 and 8 illustrate two potential methods for mechanically securing the first and second baffle members together. FIG. 7 schematically depicts an interlocking tab 68 and recess 70 on the two baffle members while FIG. 8 schematically depicts one of the baffle members being received in a recess 72 in the other baffle member. It is noted that the cross sections shown in FIGS. 7 and 8 depict a small section radially outwardly of outlet 46 and this portion of the structure shown in FIGS. 7 and 8 would completely encircle the outlet. Various other ways of securing the baffle members together may also be used including connections means other than by mechanical securement, e.g., screws and other fasteners, welding, adhesives etc. Such methods may either allow for later separation of the two baffle members or permanently secure them together. The ability to detach and reattach the baffle members could be useful for purposes of cleaning the baffle.

It is noted that forming baffle 40 out of two parts will facilitate the manufacture of the baffle because the overall structure of baffle 40 is not well suited for molding as a single unitary part. While more than two parts can also be used to manufacture baffle 40, it is generally desirable to use the smallest number of easily-manufactured parts for purposes of manufacture. Baffle 40 may be advantageously manufactured out of a glass-filled nylon material, however, other suitable materials may also be used.

As mentioned above, the baffle embodiment 40A depicted in FIGS. 9-11 includes three support members 60. This embodiment of the baffle also includes three drain ports 52. The illustrated drain ports 52 are elongate openings having a width of approximately 5 mm and a longer length, however, various other dimensions, shapes and configurations may also be used. For example, multiple openings positioned near each other could also be used to form the drain port.

Figure 9:
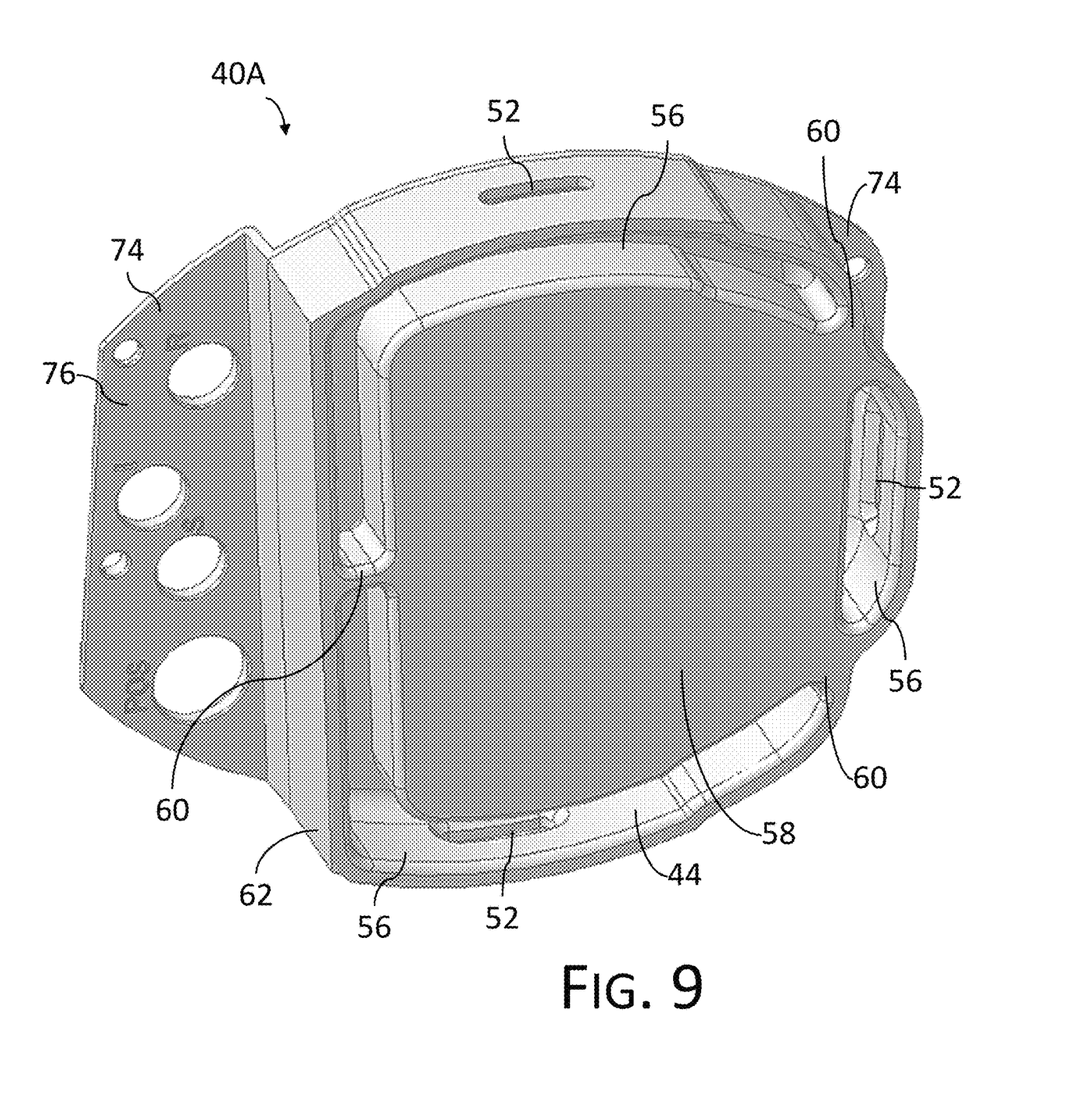
FIG. 9 is a perspective view of an alternative baffle.
Figure 10:
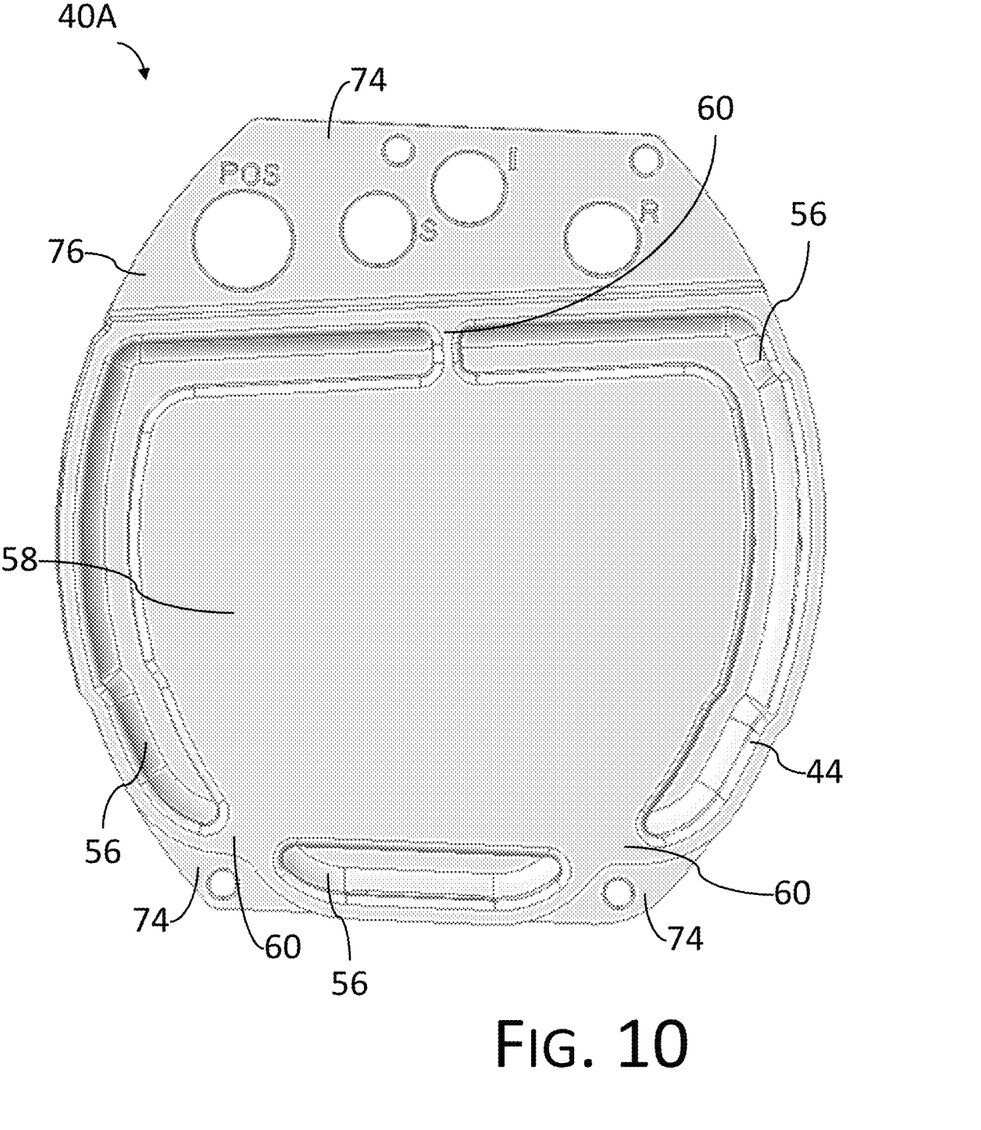
FIG. 10 is an end view of the baffle of FIG. 9.
Figure 11:
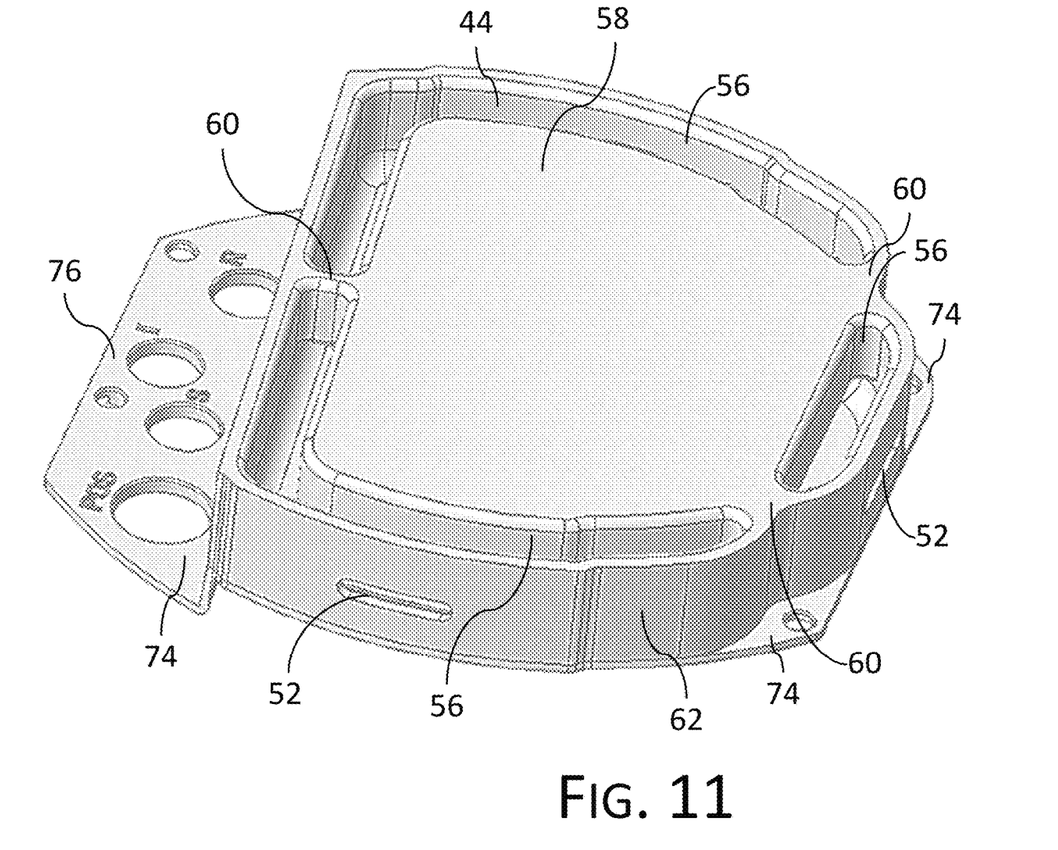
FIG. 11 is another perspective view of the baffle of FIG. 9.

The three drain ports 52 in the baffle 40A of FIGS. 9-11 are formed by openings in passageway 48 and are circumferentially distributed and separated by arcs of approximately 90 degrees about axis 26 in a plane perpendicular to axis 26. Advantageously, the baffle at least three drain ports formed by openings in the passageway, the at least three drain ports being circumferentially distributed about an arc of at least 180 degrees relative to the axis as exemplified by baffle 40A. This allows the electric machine and attached baffle 40A to be positioned in a plurality of different rotational positions about axis 26 when axis 26 extends horizontally with one of the drain ports 52 being located proximate the lowest position of passageway 48 whereby the moisture and solid matter collected within passageway 48 is directed toward the lowest one of the drain ports 52 for discharge from the baffle.

The illustrated embodiments of the baffle also include mounting flanges 74 for securing the baffle to housing 28 by means of threaded fasteners 82. One of the mounting flanges 74 also forms a faceplate 76 which includes openings 78 through which electrical terminal studs 80 extend.

Terminal studs 80 are used to operably couple electric machine 20 to an external electrical circuit, e.g., the wiring harness of a vehicle as will be readily understood by those having ordinary skill in the art. In this regard, it is noted that it will be generally preferable for terminals 80 to be positioned above or to the side of passageway 48 whereby moisture discharged through the lowest drain port 52 will not be discharged onto terminals 80. In the illustrated embodiments, the baffle does not include a drain port on the side of baffle facing the terminals 80 for this reason. An extension of the drain port, e.g., an outwardly extending tube or enclosed channel along the faceplate, that transported moisture to a position below the terminals could, however, alternatively be used and thereby allow the terminals to be positioned below passageway 48 while still preventing moisture from being discharged onto the terminals.

While the drawings depict particular configurations of a baffle, the shape of the baffle can be modified and to address the design of the electric machine on which it will be mounted, the environment in which it will be used and various other design factors and still fall within the teachings of the present application. For example, alternative embodiments might employ inlets located radially inwardly of the outlet or which intake air from the side of the baffle and turn the air flow only 90 degrees before it is discharged from the baffle. Alternatively, the baffle might include a more tortuous path to remove a higher percentage of moisture and solid matter from the air flow.

The illustrated electric machine and baffle assembly is intended for use as an alternator and is well adapted for use as an alternator in a city bus. In such an application, the engine of the bus is typically located near the lower rear portion of the bus and is subjected to water spray and grime during wet weather. During winter months in areas where salt is applied to the roads, alternators in such buses can be subjected to salt containing moisture that can cause rapid corrosion of the parts of the alternator that it contacts. The use of the illustrated baffles will reduce the amount of such salt-containing moisture that enters the housing of the alternator and will thereby prolong the useful life of such alternators.

In this regard, it is also noteworthy that the axial end at which the cooling air enters the electric machine is also the location where the integral electronics and circuitry of the electric machine are often located whereby such electronics and circuitry are the first items to be cooled by the incoming air. For example, as can be seen in FIGS. 1 and 2, the exemplary embodiment includes a regulator and associated heat sink 84 and diodes 86 at this axial end. In the absence of a baffle 40, these items can be subjected to a severe and corrosive environment due to salt-containing moisture which has the potential to shorten the useful life of the device.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
a rotor operably coupled with a stator, the rotor being rotatable about an axis;
a housing wherein the rotor and stator are disposed within the housing and the housing defines at least one housing opening allowing air to flow through the housing;
a baffle mounted on the housing and controlling an inflow of air into the at least one housing opening, the baffle defining an inlet in communication with ambient air, an outlet in communication with the at least one housing opening, and a passageway extending from the inlet to the outlet, wherein the inflow of air defines an airflow path that sequentially enters the baffle through the inlet, flows through the passageway, exits the baffle through the outlet and enters the at least one housing opening and wherein the baffle defines at least one impact surface within the passageway for changing a direction of the airflow path between the inlet and the outlet and the baffle further defines a drain port wherein the baffle is configured to direct moisture collecting on the at least one impact surface to the drain port where the moisture is discharged from the baffle to the ambient air.

2. The electric machine of claim 1 wherein the moisture is directed to the drain port and discharged from the baffle by gravity.

3. The electric machine of claim 1 wherein the electric machine includes a rotor shaft which rotates with the rotor during operation of the electric machine and a fan blade assembly coupled to the rotor shaft whereby rotation of the rotor shaft rotates the fan blade assembly, the fan blade assembly being disposed on a first axial end of the electrical machine and the baffle being mounted to a second axial end of the electric machine opposite the fan blade assembly wherein rotation of the fan blade assembly generates the inflow of air entering the at least one housing opening from the outlet of the baffle and wherein the inflow of air flows through the housing in an axial direction.

4. The electric machine of claim 1 wherein the inlet is disposed radially outwardly of the outlet relative to the axis.

5. The electric machine of claim 4 wherein the at least one impact surface directs the airflow path radially inwardly between the inlet and the outlet.

6. The electric machine of claim 5 wherein the at least one impact surface comprises a first impact surface and a second impact surface wherein the first impact surface and the second impact surface are oppositely facing and axially spaced apart from each other, and wherein the airflow path is axially redirected by the first impact surface and then axially redirected by the second impact surface between the inlet and the outlet.

7. The electric machine of claim 6 wherein each of the first and second impact surfaces direct the airflow path radially inwardly to thereby define an S-shaped airflow path between the inlet and the outlet.

8. The electric machine of claim 7 wherein the outlet defines a central opening and the inlet is formed by one or more elongate, arcuate openings disposed radially outwardly of the outlet relative to the axis.

9. The electric machine of claim 8 wherein the baffle includes a central cover member disposed axially outwardly of the outlet and having an exterior surface area which, in a plane perpendicular to the axis, is at least co-extensive with the central opening defined by the outlet.

10. The electric machine of claim 9 wherein the baffle is formed by at least two separate baffle members mechanically secured together, a first baffle member defining the outlet and a second baffle member defining the inlet.

11. The electric machine of claim 10 wherein the electric machine includes a rotor shaft which rotates with the rotor during operation of the electric machine and a fan blade assembly coupled to the rotor shaft whereby rotation of the rotor shaft rotates the fan blade assembly, the fan blade assembly being disposed on a first axial end of the electrical machine and the baffle being mounted to a second axial end of the electric machine opposite the fan blade assembly wherein rotation of the fan blade assembly generates the inflow of air entering the at least one housing opening from the outlet of the baffle and wherein the inflow of air flows through the housing in an axial direction.

12. The electric machine of claim 11 wherein the drain port comprises at least three drain ports formed by openings in the passageway, the at least three drain ports being circumferentially distributed about an arc of at least 180 degrees relative to the axis whereby the moisture is directed to one of the drain ports and discharged from the baffle by gravity in a plurality of different rotational orientations when the axis is positioned horizontally.

13. The electric machine of claim 12 further comprising a mounting flange extending from the second baffle member, the mounting flange being secured to the housing.

14. The electric machine of claim 13 wherein the mounting flange includes at least one flange opening and wherein an electrical terminal extending from the housing which is adapted to operably couple the electric machine to an external electrical circuit extends through the at least one flange opening.

15. The electric machine of claim 14 wherein the electrical machine is adapted to function as a vehicle alternator.

16. The electric machine of claim 1 wherein the at least one impact surface radially and axially redirects the airflow path between the inlet and the outlet.

17. The electric machine of claim 1 wherein the drain port comprises at least three drain ports formed by openings in the passageway, the at least three drain ports being circumferentially distributed about an arc of at least 180 degrees relative to the axis whereby the moisture is directed to one of the drain ports and discharged from the baffle by gravity in a plurality of different rotational orientations when the axis is positioned horizontally.

18. The electric machine of claim 17 wherein:
the outlet defines a central opening and the inlet is formed by one or more elongate, arcuate openings disposed radially outwardly of the outlet relative to the axis; and
the at least one impact surface comprises a first impact surface and a second impact surface wherein the first impact surface and the second impact surface are oppositely facing and axially spaced apart from each other, wherein the airflow path is axially redirected by the first impact surface and then axially redirected by the second impact surface and wherein each of the first and second impact surfaces direct the airflow path radially inwardly to thereby define an S-shaped airflow path between the inlet and the outlet.

19. The electric machine of claim 18 wherein the electric machine includes a rotor shaft which rotates with the rotor during operation of the electric machine and a fan blade assembly coupled to the rotor shaft whereby rotation of the rotor shaft rotates the fan blade assembly, the fan blade assembly being disposed on a first axial end of the electrical machine and the baffle being mounted to a second axial end of the electric machine opposite the fan blade assembly wherein rotation of the fan blade assembly generates the inflow of air entering the at least one housing opening from the outlet of the baffle and wherein the inflow of air flows through the housing in an axial direction.

20. The electric machine of claim 19 wherein the baffle is formed by at least two separate baffle members mechanically secured together, a first baffle member defining the outlet and a second baffle member defining the inlet, the drain ports being formed by openings in the second baffle member.

* * * * *